United States Patent [19]

Danielsson

[11] Patent Number: 4,849,917
[45] Date of Patent: Jul. 18, 1989

[54] SPEED DIFFERENCE MEASUREMENT IN STRIP CASTING

[75] Inventor: Dag Danielsson, Västerås, Sweden

[73] Assignee: ASEA Aktiebolag, Västerås, Sweden

[21] Appl. No.: 30,447

[22] Filed: Mar. 27, 1987

[30] Foreign Application Priority Data

Apr. 3, 1986 [SE] Sweden ................. 8601491

[51] Int. Cl.$^4$ ................. B22D 11/16; G01P 3/00
[52] U.S. Cl. ................. 364/565; 364/472; 340/671; 356/28; 73/510; 164/451
[58] Field of Search ................. 364/565, 468, 469, 472; 340/670-672, 675; 73/505, 506, 510; 164/4.1, 451, 454; 356/27, 28

[56] References Cited

U.S. PATENT DOCUMENTS

| | | | |
|---|---|---|---|
| 4,341,259 | 7/1982 | Lavener ................. | 164/413 |
| 4,523,624 | 6/1985 | Dantzig et al. ................. | 164/454 |
| 4,691,758 | 9/1987 | Palmer ................. | 164/461 |

Primary Examiner—Parshotam S. Lall
Assistant Examiner—Brian M. Mattson
Attorney, Agent, or Firm—Watson, Cole, Grindle & Watson

[57] ABSTRACT

In strip casting, a melt is pressed between a travelling belt and a casting drum rotating along with the belt. A method and device for measuring the speed difference between the speed of the belt and the peripheral speed of the drum involves providing the belt on one side with a pattern of alternately darker and lighter stripes. Around the periphery of the casting drum there is arranged a number of measuring zones, each having the same width as that of the stripes. Each measuring zone includes a transducer built up of a number of photocells which, via optical conductors opening out to the measuring zones, can be activated by the stripes. When, during a casting operation, a measuring zone has arrived at a given measuring region, the number of activated photocells is read. The same procedure is repeated when the same transducer arrives at the end of the measuring region. With knowledge of the extension of the measuring zone and the measuring region and the number of photocells in each zone, the speed difference, expressed as a percentage, together with the difference in activating photocells, can be calculated.

3 Claims, 1 Drawing Sheet

SPEED DIFFERENCE MEASUREMENT IN STRIP CASTING

TECHNICAL FIELD, BACKGROUND ART

Strip casting means the production of a cast strip (which term also includes a sheet) by pressing a melt between a travelling belt, which belt, via solidifying melt, makes contact with part of the periphery (the casting region) of a casting drum rotating along with the belt so that the casting region moves continuously around the periphery of the drum during the casting process.

Melt can, for example, be fed continuously into a V-shaped cleft formed between the casting drum and the travelling belt in a tangential direction as the belt enters the casting region. The belt leaves the casting drum tangentially at the downstream end of the casting region and supports the cast strip in its movement away from the drum.

The thickness of the cast strip is determined by several factors, the most important being the following:

The depth of the melt formed in the V-shaped cleft.
The composition or alloying of the melt.
The temperature of the melt.
The speed of the travelling belt and the peripheral speed of the casting drum.
The prestress in the travelling belt.
The elasticity of the travelling belt.
The degree of cooling of the casting drum and the travelling belt.

The quality characteristics of the cast strip are also dependent on the above-mentioned factors to a large extent. In addition, it has been shown that the quality of the strip is to a very large extent dependent on whether the peripheral speed of the casting drum exactly matches the speed of the belt. For the best quality casting, there must be no slipping between the strip to be cast, and the casting drum and between the strip to be cast and the travelling belt, respectively. If the respective speeds are different, the cast strip during the casting and solidification process is subjected to an internal stress between the layer which makes contact with the drum and the layer which makes contact with the belt. The direction of this stress is dependent upon which is greater: the speed of the belt or the peripheral speed of the drum.

The above-mentioned internal stresses give rise to the formation of cracks and to some degree of brittleness in the as-cast strip both of which faults may make the cast material unsuitable for further processing.

Several different principles for driving the travelling belt and the casting drum have been tried. One method involving a fixed gear changed between a drive means for the belt and the drum has proved to function very badly, especially if cast strips of different alloys and thicknesses are to be produced with the same equipment.

Different embodiments of the "master-slave" principle, in which, for example, the drive means for the travelling belt has been selected for determining the casting speed and in which the drive means of the casting drum has been designed so as to follow the main drive in the best possible way, have also been tried but have also been shown to give rise to problems.

SUMMARY OF THE INVENTION

The present invention relates to a method and a device for measuring the relative angular velocity between a casting drum and that part of the travelling belt which makes contact with the strip to be cast in the casting region. Indirectly, this means that a possible speed difference between the peripheral speed of the casting drum and the speed of the travelling belt can be measured and hence can be employed for regulating purposes, for example for obtaining an equality in the speeds.

The invention provides the travelling belt on its side facing the casting drum with a pattern of stripes which have a fixed width in the direction of travel of the belt. Around the casting drum, and preferably evenly distributed around the periphery, there is arranged a number of measuring zones having the same widths as those of the stripes on the travelling belt. Each measuring zone is positioned so that it will confront the raster-like striped pattern on the belt as the drum rotates. Conveniently, each measuring zone consists of or comprises one transducer mounted close to the periphery of the casting drum which is sensitive to the darkness/lightness of the stripes in the travelling belt. Each transducer can consist of a plurality of optical conductors (e.g., optical fibers), having their ends exposed on the periphery of the casting drum and communicating with a corresponding number of photon-sensitive devices (e.g., photocells) mounted somewhere in or on the drum.

A peripheral measurement region with an extension equal to a fixed multiple of the width of the measuring zone can then be defined, for example as that part of the periphery of the casting drum which is covered by the travelling belt (i.e., the casting region). When, during a casting operation, a measuring zone or its transducer has entered the measuring region, the number of activated photon-sensitive devices, and whether the first or the last device in the direction of movement is activated, are read by means of the raster of stripes on the belt. Then when the same transfucer arrives at the end of the measuring region, a new reading can be made as to how many photon-sensitive devices are activated via the raster of stripes on the belt. If the number of activated photocells has been changed, increased or reduced, the same relative speed exists between the belt speed and the peripheral speed of the casting drum. The direction of the relative change is determined by whether the number of active photon-sensitive devices has increased or reduced and whether the first or the last device is activated, and by an additional number of boundary conditions which are to be described hereafter. The information obtained can then be utilized for regulating the respective drive means so that a practical, acceptable speed equality can be attained.

BRIEF DESCRIPTION OF THE DRAWINGS

The invention will now be further described, by way of example, with reference to the accompanying drawings, in which.

DESCRIPTION OF PREFERRED EMBODIMENTS

Figure 1:
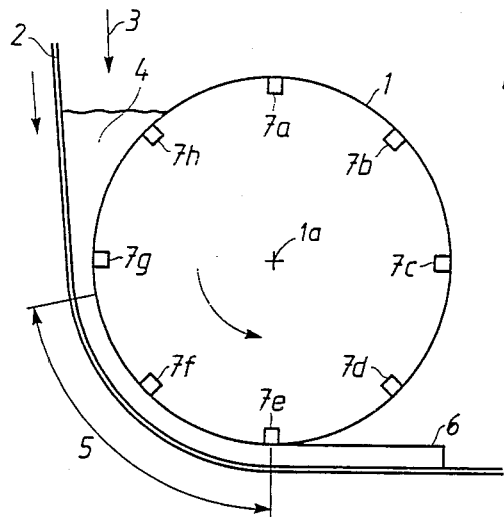
FIG. 1 shows a casting drum and part of a travelling endless belt, a melt and a casting gutter.

FIG. 1 shows schematically a device for strip casting. Between a casting drum 1 and an endless travelling casting belt 2 there is continuously filled (at 3) a melt 4 which solidifies in a casting region 5 to form a cast strip 6.

Around the periphery of the casting drum 1 and on one side of the drum, a number of measuring zones 7a-7h are evenly distributed, each measuring zone extending in parallel with the axis of rotation 1a of the drum and each comprising a transducer.

On that side of the travelling belt 2 facing the casting drum 1 and on that edge of the belt corresponding to that edge of the casting drum 1 on which the measuring zones and the transducers are located, the belt 2 is formed with a raster pattern having alternately darker and lighter stripes. The extension (width) of the rasters in the travelling direction of the belt 2 is equal to the peripheral extension or width of the measuring zones.

Figure 2:
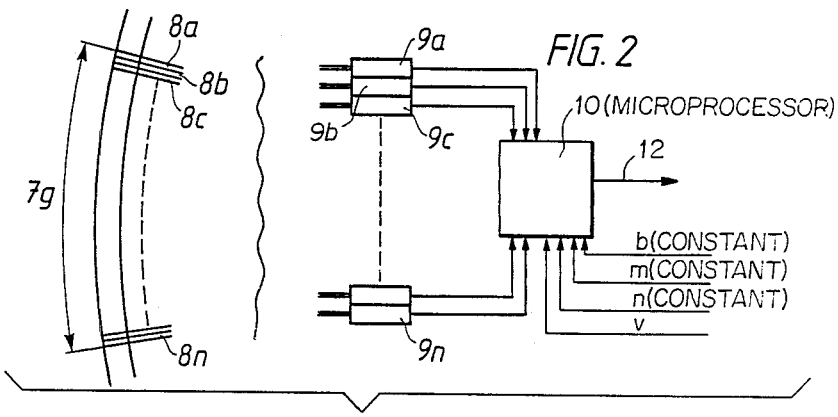
FIG. 2 shows a measuring zone with photocells connected by way of example conductors.

As will have been clear from the above description of the principle, the transducers consist of a number of optical conductors and a corresponding number of photocells and cover the entire extension of the measuring zone. From a purely practical point of view, the transducer can be formed according to FIG. 2. To obtain the desired resolution capacity, a relatively large number of photocells should be included in the transducers of each measuring zone. A good resolution capacity also requires that the peripheral extension of the measuring zones should be restricted. In practice this means that, from the space point of view, the photocells cannot be located directly at the periphery of the casting drum 1. To transmit the information about the position of the rasters in relation to the measuring zones, optical conductors are therefore used which open out onto the periphery of the casting drum 1 in the measuring zone, thus obtaining a considerably higher packing density. As will be clear from FIG. 2, showing the transducer for the measuring zone 7g indicated in FIG. 1, a number of optical conductors 8a to 8n are placed in each measuring zone. Via each of these conductors, current information is transmitted to the respective photocells 9a to 9n, located inside the casting drum 1 for further signal processing in a computing means (microprocessor) 10.

In one embodiment, the belt 2 may be rastered with alternately light and dark stripes having an extension in the travelling direction of the belt 2 of, for example, 1 mm. With the arrangement described with reference to FIG. 2, the peripheral extension of each measuring zone 7a to 7h should have the same width, that is, also 1 mm. Each measuring zone may, for example, be covered by 20 optical conductors, each one then having an extension of 0.05 mm in the peripheral direction of the drum 1.

Figure 3:
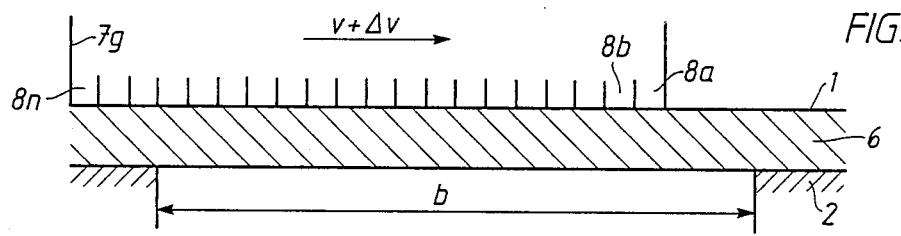
FIGS. 3 and 4 show a measuring zone and a part of the travelling belt making contact therewith.

When a transducer, for example the transducer in the measuring zone 7g, has just entered the measuring region, which may be the casting region 5 shown in FIG. 1, an overlap configuration between the measuring zone and the rastered belt 2 may have an appearance as illustrated in FIG. 3. In the example shown in FIG. 3, the first 17 optical conductors 8a to 8n-3 overlap the light stripe "b" of the belt 2, so that the corresponding photocells 9a to 9n-3 indicate an overlap of 17/20 of 1 mm.

Figure 4:
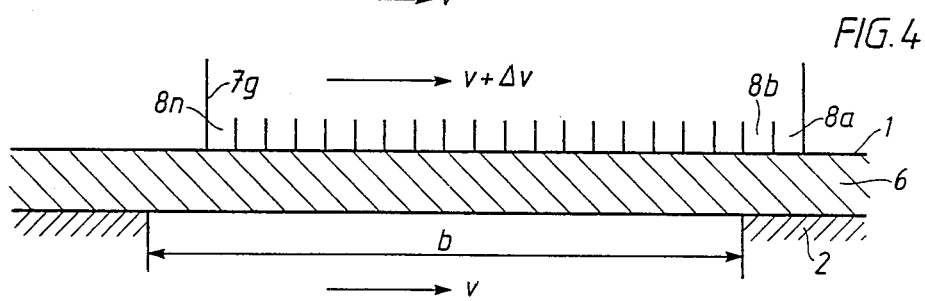

If there is a speed difference between the belt 2 and the drum 1, when the transducer 7g arrives at the end of the measuring region, the overlap configuration between the transducer and the raster "b" will have changed and may have an appearance as shown in FIG. 4. Now the overlap is from conductor 8c to conductor 8n (i.e., 18 conductors in all). From this it is clear that the peripheral speed or angular speed of the casting drum 1 is somewhat greater than the corresponding speed of the belt 2, the photocells of the transducer, via the optical conductors, now showing that only the last 18 photocells are activated. Therefore, in total terms, a displacement amounting to (3+2)/20 of the measuring zone, or in this case 0.25 mm, has taken place between the belt 2 and the drum 1 within the measuring region.

From a general point of view, it is simple to prove that when b=the extension of the measuring zone in a peripheral direction n=the number of photocells within the measuring zone dn=a change in the number of activated photocells within the measuring region for the same measuring zone m=the peripheral extension of the measuring region, and v=the nominal belt speed then the speed difference (dv) between the belt and the periphery of the casting drum is $$dv = \frac{v \cdot dn \cdot b}{m \cdot n}$$

By dividing this expression by v and multiplying by 100, the speed difference (p), expression as a percentage, is obtained, that is $$p = \frac{dv}{v} = \frac{dn \cdot b}{m \cdot n} \cdot 100\%$$

A simple and classical device for determining which of the speeds—the speed of the belt or the peripheral speed of the drum—is greater may consist of a tachometer mounted on a deflector roll for the travelling belt and a tachometer mounted on the shaft of the casting drum, possibly a tachometer mounted via a friction or other coupling connected to the periphery of the drum. By adjusting the output voltages of the tachometers so that they deliver the same signal when the two speeds are equal, and then connecting the signals in opposition, a polarized signal is obtained which indicates which of the speeds is greater. Because of the relatively low speeds which may occur in this connection, the accuracy in determination will be exceedingly limited.

To be able better to determine whether the peripheral speed of the casting drum 1 is higher or lower than the speed of the belt 2, it is possible, as stated in the above description of the principle of the invention, to find out which of the first or the last photocell is initially activated. From FIGS. 3 and 4 it will be clear that the first photocell is activated via the optical conductor 8a when the measuring zone enters the measuring region and that the last photocell is activated via the optical conductor 8n when the measuring zone leaves the measuring region. As will be clear from the above, when 8a is activated before 8n, this indicates that the peripheral speed of the casting drum 1 is higher that the speed of the belt 2. In a corresponding way, it can be determined whether the peripheral speed of the casting drum 1 is lower than the speed of the belt 2.

From a general point of view, there are a large number of different boundary conditions that have to be evaluated to be able to determine whether it is the speed of the belt 2 or the peripheral speed of the drum 1 which is greater. The following parameters, which describe how a transducer is positioned in relation to one and the same light raster upon entering and leaving the measuring region, respectively, are made the basis of the decision.

fiOf indicates that no photocell is activated upon entering the measuring region; the first photocell of the transducer in the direction of movement is positioned ahead of the first light raster in the measuring region;

fiI indicates that at least the first photocell is activated upon entering the measuring region;

fis indicates that all of the photocells are activated upon entering the measuring region;

fin indicates that at least the last photocell is activated upon entering the measuring region;

fiOe indicates that no photocell is activated when leaving the measuring region; the last photocell of the transducer is positioned after the first light raster in the measuring region;

fuOf indicates that no photocell is activated when leaving the measuring region; the first photocell of the transducer is positioned ahead of the current light raster;

fuI indicates that at least the first photocell is activated when leaving the measuring region;

fus indicates that all of the photocells are activated when leaving the measuring region;

fun indicates that at least the last photocell is activated when leaving the measuring region;

fuOe indicates that no photocell is activated when leaving the measuring region; the last photocell of the transducer is positioned after the current light raster.

If ni=the number of activated photocells upon entering the measuring region, and nu=the number of activated photocells when leaving the measuring region, then dn=ni—nu.

Let dnp=dn when ni>nu.

and dnm=dn when ni<nu.

When fiOf and fuOf and when fiOe and fuOe occur, dn is valid for the immediately preceding raster upon entering the measuring region and for the immediately succeeding raster when leaving the measuring region, respectively.

The peripheral speed of the drum 1 is greater than the speed of the belt 2, that is, $v_{drum} > v_{belt}$ when the following conditions, expressed in Boolean algebra, exist:

$$v_{drum} > v_{belt}:$$

$$fiOf\,(ful + fus + fun + fuOe) +$$

$$fil\,(ful \cdot dnm + fus + fun + fuOe) +$$

$$fis\,(fun + fuOe) +$$

$$fin\,(fun \cdot dnp + fuOe) +$$

$$fiOe \cdot fuOe \cdot dnm$$

In all other cases, apart from the case where dn=0, the speed of the belt 2 is greater than the peripheral speed of the drum 1. This can also be explicitly expressed as follows:

$$v_{belt} > v_{drum}:$$

$$fiOf \cdot fuOf \cdot dnm +$$

$$fil\,(fuOf + ful \cdot dnp) +$$

$$fis\,(fuOf + ful) +$$

$$fin\,(fuOf + ful + fus + fun \cdot dnm) +$$

$$fiOe\,(fuOf + ful + fus + fun + fuOe \cdot dnp)$$

The execution of these logical decisions are trivial operations, per se, which may be carried out in many different ways.

All of the signals obtained via the photocells of the transducers cannot, of course, be brought out of the casting drum 1 for further signal processing. Above all, the quantity of signals to be processed and also the simple calculations and logical decisions to be made presuppose the mounting of a microprocessor 10 inside the casting drum 1. The data input means 11 enables the microprocessor to be programmed with the constants b, m and n, which, in principle, are fixed as well as with the current information about the belt speed and possibly the peripheral speed of the casting drum if this is desired as a comparison speed. The microprocessor has to be programmed, based on signals from the photocells, to produce dn and calculate dv, which signal, can be supplied to the control equipment of the drive means via line 12.

What is claimed is:

1. A strip casting machine which comprises
   a rotatable casting drum having a periphery and an axis of rotation, said casting drum providing a plurality of measuring zones in said periphery which are equally circumferentially spaced apart and which extend in parallel with said axis of rotation, said measuring zones having an identical and uniform width along the periphery of said casting drum,
   a movable casting belt which is mounted to extend around a portion of said periphery of said casting drum to provide a casting region therebetween, said casting belt having a surface which faces said casting region and which includes thereon a raster pattern of alternating light and dark transverse stripes, each of said stripes having a width equal to said uniform width.
   a transducer mounted in each said measuring zone in said casting drum, each transducer comprising an equal plurality of optical conductors and a plurality of photocells, each optical conductor being connected to a respective photocell and each having an input end located at the periphery of said casting drum such that the input ends of said plurality of optical conductors are aligned along the width of the measuring zone in which they are located, and
   a computing means mounted in said casting drum and to which said plurality of photocells are connected, said computing means, as said casting drum rotates and said casting belt moves, functioning to determine any difference, dn, in a number of said plurality of optical conductors of each said transducer that detect a certain one of said stripes of said casting belt as each said transducer moves from a first position relative to said casting to a second position relative to said casting region, said second position being located at a peripheral distance from said first position, thereby providing an indication of any difference in speed of rotation of said casting drum and speed of movement of said casting belt, and means connected to said computing means for inputting a value b that is equal to the width of said measuring zone, a value m equal to the peripheral distance between said first and second positions, a value n equal to said plurality of optical fibers in said measuring zones, and a value v equal to the speed of the casting belt, such that said computing means can determine said difference in speed of rotation of said casting drum and speed of movement of said casting belt (dv) based on the equation $$dv = \frac{v \cdot dn \cdot b}{m \cdot n}$$

2. In a strip casting machine which comprises a rotatable casting drum having a periphery and an axis of rotation, and a movable casting belt which is mounted to extend around a portion of said periphery of said casting drum to provide a casting region therebetween, said casting belt including a surface which faces said casting region, a method of determining any difference in speed of rotation of said casting drum and speed of movement of said casting belt which comprises the steps of
 (a) providing a raster pattern of alternating light and dark transverse stripes on said surface of said casting belt, each said stripe having an identical and uniform width,
 (b) providing a plurality of equally circumferentially spaced transducers in the periphery of said casting drum, each of said transducers extending in parallel with said axis of rotation of said drum and having a width along the periphery of said casting drum which is equal to said width of said stripes on said surface of said casting belt, each of said transducers comprising a plurality of optical fibers which are aligned along the width thereof, and
 (c) rotating said casting drum and moving said casting belt such that each said transducer will move from a first position relative to said casting region where at least one of the optical fibers thereof will sense a certain stripe on said casting belt to a second position relative to said casting region where at least one of the optical fibers thereof will again sense said certain stripe on said casting belt, said second position being located at a peripheral distance from said first position,
 (d) determining any difference, dn, between a number of optical fibers of each transducer which sense said certain stripe at said first position and at said second position, and
 (e) calculating a speed difference, dv, according to the formula $$dv = \frac{v \cdot dn \cdot b}{m \cdot n}$$

wherein v is the speed of the casting belt, b is the width of a transducer, m is the peripheral distance between said first and second positions, and n is equal to said plurality of optical fibers in a measuring zone.

3. The method according to claim 1, wherein step (d) comprises calculating a percentage speed difference, p, according to the formula $$p = \frac{dv}{v} = \frac{dn \cdot b}{m \cdot n} \cdot 100\%$$

wherein b is the width of a transducer, m is the peripheral distance between said first and second positions, and n is the number of optical fibers in a transducer.

* * * * *